United States Patent Office 3,238,091
Patented Mar. 1, 1966

---

3,238,091
METHOD FOR COMBATING INSECTS WITH 2-SEC.-BUTOXY-PHENYL-N-METHYLCARBAMATE
Ernst Böcker and Rudolf Heiss, Cologne-Stammheim, and Wolfgang Behrenz, Wuppertal-Elberfeld, Germany, assignors to Farbenfabriken Bayer Aktiengesellschaft, Leverkusen, Germany, a corporation of Germany
No Drawing. Filed July 6, 1961, Ser. No. 122,075
Claims priority, application Germany, July 12, 1960,
F 31,640
2 Claims. (Cl. 167—30)

The present invention relates to and has as its objects a new and useful insecticidal substance which is highly active especially against ecto-parasites. It is obtainable by converting 2-sec.-butoxyphenol into the corresponding N-methylcarbamate of the following Formula II:

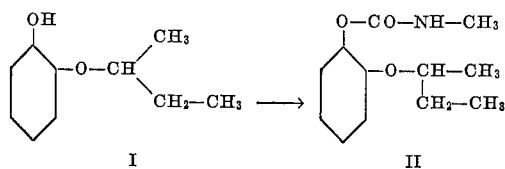

The processes for the production of the 2-sec.-butoxyphenyl-N-methylcarbamate II from the phenol I are known in principle. The compound is obtained e.g. by reacting 2-sec.-butoxyphenol with methyl-isocyanate or methylcarbamic acid chloride or with phenyl- or 2-chlorophenyl-N-methylcarbamate. Furthermore, the substance can be obtained by reacting 2-sec.-butoxyphenyl-chloroformic acid ester or bis-2-sec.-butoxyphenyl-carbonic acid ester with methylamine.

The following examples are given for the purpose of illustrating the present invention:

Example 1

24.9 grams (0.15 mol) of 2-sec.-butoxyphenol and 9.4 grams (0.165 mol) of methylisocyanate are mixed with 10 ml. of dioxane and treated with a drop of triethylamine as catalyst. After a short time, the reaction mixture spontaneously warms up. After standing at room temperature for one day, the bulk of the reaction product has crystallized out. After filtering off with suction, the mother liquor is diluted with ligroin whereupon a second fraction precipitates. The combined crystallization products are briefly rubbed with water, in order to remove any dimethylurea that may have formed, again filtered off with suction and dried. The yield of 2-sec.-butoxyphenyl-N-methylcarbamate amounts to 33.3 grams or 98.8% of the theoretical, M.P. 60–63° C.

Example 2

Female ticks of the species *Boophilus microplus* (sufficiently fed, i.e. fully sucked) are immersed in various concentrated solutions of 2-sec.-butoxyphenyl-N-methylcarbamate for 1 minute. The experiment is evaluated 21 hours after treatment. For comparison the same investigation is carried out with the known insecticide α-naphthyl-N-methylcarbamate.

The experimental results are listed in the following table:

| Preparation | Concentration of active substance in percent | Ticks destroyed in percent |
| --- | --- | --- |
| 2-sec.-butoxyphenyl N-methylcarbamate | 0.3 | 100 |
|  | 0.15 | 100 |
|  | 0.1 | 100 |
|  | 0.05 | 100 |
|  | 0.025 | 100 |
|  | 0.01 | 50 |
| α-Naphthyl-N-methylcarbamate | 0.3 | 100 |
|  | .15 | 80 |
|  | 0.1 | 60 |
|  | 0.05 | 60 |
|  | 0.025 | 20 |

The table shows that the product according to the invention has a substantially higher activity than the known compound for this purpose, especially at low concentrations of active substance.

We claim:
1. A method for combating insects which comprises contacting the insects with an effective amount of 2-sec.-butoxyphenyl-N-methylcarbamate.
2. A method for combating ticks which comprises contacting the ticks with an effective amount of 2-sec.-butoxyphenyl-N-methylcarbamate.

References Cited by the Examiner
UNITED STATES PATENTS
2,209,245   7/1940   Bartholomaus _____ 260—479
2,776,197   1/1957   Gysin et al. _____ 260—479
3,111,539  11/1963   Bocker et al. _____ 167—30

OTHER REFERENCES
Kolbezen et al., J. Agricultural & Food Chem. 2, 864–870 (1954).

FRANK CACCIAPAGLIA, Jr., *Primary Examiner.*

ABRAHAM H. WINKELSTEIN, DANIEL D. HORWITZ, MORRIS O. WOLK, IRVING MARCUS, LEWIS GOTTS, *Examiners.*